(12) United States Patent
Rankin (10) Patent No.: US 11,429,390 B2
(45) Date of Patent: Aug. 30, 2022

(54) HIGH-LEVEL PROGRAMMING LANGUAGE WHICH UTILIZES VIRTUAL MEMORY

(71) Applicant: John Rankin, Williamsport, OH (US)

(72) Inventor: John Rankin, Williamsport, OH (US)

(73) Assignee: Rankin Labs, LLC, Williamsport, OH (US)

( * ) Notice: Subject to any disclaimer, the term of this patent is extended or adjusted under 35 U.S.C. 154(b) by 0 days.

(21) Appl. No.: 17/112,072

(22) Filed: Dec. 4, 2020

(65) Prior Publication Data

US 2021/0173658 A1    Jun. 10, 2021

Related U.S. Application Data

(60) Provisional application No. 62/944,393, filed on Dec. 6, 2019.

(51) Int. Cl.
*G06F 9/38* (2018.01)
*G06F 8/30* (2018.01)
*G06F 9/30* (2018.01)

(52) U.S. Cl.
CPC ............ *G06F 9/3836* (2013.01); *G06F 8/31* (2013.01); *G06F 9/3013* (2013.01)

(58) Field of Classification Search
CPC .................................................... G06F 9/3836
See application file for complete search history.

(56) References Cited

U.S. PATENT DOCUMENTS

| 4,493,027 | A | 1/1985 | Katz et al. |
| 2007/0112714 | A1 | 5/2007 | Fairweather |
| 2015/0052323 | A1* | 2/2015 | Noel ................... G06F 9/4413 711/162 |
| 2016/0034397 | A1* | 2/2016 | Lam ................... G06F 12/0817 711/119 |
| 2016/0170896 | A1* | 6/2016 | Steiss ................... G06F 12/109 711/154 |
| 2017/0010900 | A1 | 1/2017 | Cobb |
| 2017/0012951 | A1 | 1/2017 | Mennes et al. |
| 2018/0060244 | A1 | 3/2018 | Godard et al. |
| 2018/0203805 | A1* | 7/2018 | Hatta ................... G06F 9/45558 |
| 2019/0266101 | A1 | 8/2019 | Robinson et al. |

* cited by examiner

*Primary Examiner* — Michael J Metzger
(74) *Attorney, Agent, or Firm* — Standley Law Group LLP; Jeffrey S. Standley; Adam J. Smith (57) ABSTRACT

Systems and methods for utilizing virtual memory with a high-level programming language are provided. Multiple address spaces are created in virtual memory, wherein each of the multiple address spaces include data entries, each of which have a value. A machine executable software program is operated which utilizes each of said multiple address spaces. At least a first one of the address spaces is independent from at least a second one of said address spaces, and at least a third one of the address spaces is electronically associated with at least a fourth one of the address spaces.

14 Claims, 3 Drawing Sheets

HIGH-LEVEL PROGRAMMING LANGUAGE WHICH UTILIZES VIRTUAL MEMORY

CROSS-REFERENCE TO RELATED APPLICATIONS

This application claims the benefit of U.S. Provisional Application Ser. No. 62/944,393 filed Dec. 6, 2019, the disclosures of which are hereby incorporated by reference as if fully restated herein.

TECHNICAL FIELD

Exemplary embodiments relate generally to systems and methods for high-level programming languages which utilize virtual memory storage spaces.

BACKGROUND AND SUMMARY OF THE INVENTION

High-level programming languages, such as Cobol, Fortran, PL1, C, C++, and Algol are severely limited to their ability to express where data is stored. The goal of such high-level programming languages is generally to isolate the programming process from the machine-level instructions. Any given computing machine is controlled by the machine-level instructions which reflect, and are sometimes defined by, the given machine's unique architecture. These instructions are often specific to the machine, and may be vastly different between various computing machines. The creation of high-level programming languages allows a natural expression for programming that is ultimately translated into a form that the specific machine can utilize.

A program written in a high-level programming language must be converted to machine-level instructions by a language compiler to perform actual operations on the computing machine. This compiling process allows the programmer to write a program in a more readable and clearer format, rather than the more complex and detailed machine-level instructions that the computing machine actually requires for operation. Essentially, these high-level programming languages serve as shorthand for the machine-level instructions.

High-level programming languages were developed to provide a more plain-English-like description of the underlying machine operation. However, the details of the machine-level language are generally more accurate and provide more precise control over the computing machine's actual operations. Each specific instruction performs an operation interacting between memory, registers, accumulators, or stacks to achieve the single operation. This is quite different from a high-level programming language where the more natural expression is less specific to the actual machine operation. Indeed, the compiler may implement the machine-level code translation of the high-level programming in a number of ways. Furthermore, because the high-level programming language is not tied to machine-level instructions, multiple implementations may be produced for distinctly different machines while providing identical syntaxes for the high-level programmer. Essentially, the same high-level programming language may be used, with an appropriate complier (i.e., translator), for a given computing machine.

Storage usage in high-level programming languages is significantly different than usage in machine-level languages. When instructions operate at the machine level, there is generally no limit to how storage may be managed and manipulated. High-level programming languages, on the other hand, generally require a far more organized and predefined arrangement of storage. As a program operates, its translated version must be able to reasonably locate and manipulate the predefined variables. There are examples of programs that dynamically allocate storage to use, but even these areas must be carefully defined so that the language compiler may produce a machine-level interpretation of the storage access.

There is a general category of electrical machinery that is often referred to as a "computing machine" or "computer." These computing machines are sometimes connected to, or interfaced with, a wide variety of equipment to produce and operate an almost inexhaustible number of devices. Furthermore, these computing machines operate under the control of programming. Programming may vary the machine's operation, and may function based upon real time decision selection, or external events, that are generally communicated using external device input. Computing machines operate under the direction of these programs, which execute machine code instructions. Machine code instructions are the basic operational codes that control the machine's operation and are entirely specific to the type and manufacture of the computing machine.

Machine-level code may come in as many different varieties as the number of computing machines available. It is common to develop a pseudo machine which may be universally implemented by many different types of computing machines having many different machine-level code instructions, and thus provide greater portability for programs and object code. This recent development has produced a number of fictitious and pseudo machine definitions that allow for the execution of pseudo code within an emulated pseudo or virtual environment.

There are generally two types of machine operation implementation: register or accumulator, and stack architecture. The register machines have high speed memory locations which can store information, numbers, or addresses, and are called registers or accumulators. Machine-level instructions may perform operations upon the data held in the registers and may utilize this data to also manipulate and change data stored in general memory. A stack-oriented machine does not implement any specialized locations, but rather has a memory stack. The memory stack is effectively a pointer to a portion of general memory that allows data to be pushed onto and off from the stack; generally, in a last in, first out sequence. Machine-level instructions perform operations upon the data held in the stack and replace, remove, or insert their results upon the stack.

Computing machines most often utilize a complex instruct set code ("CISC") for their instruction set. In other words, the number of instructions available for programming operations are often extensive and complex. Some machines have developed many hundreds of machine instructions during their evolutionary development, and these complex sets of instructions include a wide variety of instruction variations. For example, a given machine-level instruction set often includes an add, add short, add long, add decimal, and add immediate instruction. Each of these different versions of the add instruction are designed to perform addition against different data types. In this brief list, add would operate upon integers, while add long operates upon a 64-bit floating point number. By continually expanding instruct sets, these CISC machines are extremely flexible and offer a large pallet of programming options.

Prior to the development of extremely thin microelectronics, there was a push to reduce the complexity of the processing unit of computing machines. This development produced Reduced Instruction Set Code ("RISC") machines. The overall design objective of these instruction sets was to reduce the sheer number of instructions being used in order to improve the efficiency of computing power due to the reduction in necessary electrical circuits. While this approach produced an efficiency in electrical speed, it was ultimately replaced by the exponential reduction in computer size. Furthermore, the complex software still required instructions, and often those instructions involved far more of the RISC instructions than the CISC instructions would have consumed. The failure of RISC as an architectural objective was due to the continued complex requirements from the higher-level software that drove the use of the RISC instructions beyond their intended efficiency.

The fundamental idea behind virtual storage is the ability to appear to utilize far more memory space than is actually available. This is made possible because certain locations within memory are used less often than others. The concept is similar to reserves in banking, where the bank holds only the cash that is expected to be used rather than the entire aggregate that might be held in trust. It is unlikely that all customers will ask for all their money, all at the same time. Therefore, the bank needs to only have on hand what the bank reasonably expects will be requested during a given time period.

This internal hardware control over virtual storage is accomplished using two major controls. First, a translation table must be maintained to facilitate mapping virtual addresses to real addresses. As an instruction is executed by the hardware processor, all addresses necessary for the machine instruction to be completed must be resolved. This resolution process involves looking up the virtual address within the translation table and dynamically converting the virtual address to the corresponding real address. Once all addresses have been translated, the instruction may be executed and the illusion of the larger virtual area is complete.

Second, when the dynamic address translation process fails to produce a valid real address for use, an interruption of the normal machine program execution occurs. Control is passed to the machine's operating system and gives the operating system the opportunity to manipulate memory. The operating system either assigns an available free piece of real memory that is added to the translation table, or swaps out a piece of lesser used real memory to make room for a piece of storage previously moved to long term storage. The dynamic translation table is updated and the interrupted program is resumed to permit the instruction execution to complete normal operations.

Since the internal hardware of the computing machine is designed to allow for the use of virtual memory, these machines provide a wide range of support for multiple virtual memory areas within the machine; therefore, a single operating program may have access to more than one virtual area at a time, or different programs within the machine may be assigned specific virtual memory areas for their operation.

The two major controls over virtual storage operation are tightly connected to both the hardware and the operating system of the given machine. The dynamic address translation table must be managed by the operating system, as does the interruption method for switching between real memory usage and physical long-term storage.

When a program, written in machine-level language, has access to multiple virtual storage areas, the specific location of data may be highly mixed in origin. Rather than cohesive areas of storage, an individual instruction might operate on data stored in different address spaces, while the program itself resides in yet another unique virtual address space. This use of multiple address spaces may vary from instruction to instruction, thereby creating a multidimensional program execution model. While this type of programming is complex, it is also attainable due to the method and operation of individual machine-level instructions. Furthermore, while machine operations might differ between platforms, the low-level execution allows similar types of multidimension access regardless of specific architecture type.

When applying these same necessities to high-level programming languages, the options and available addressability becomes a serious issue. Since high-level programming languages require careful predefinitions for data use, there is little to no available nomenclature that could be used. The best that may be expected with currently available languages are function or system calls that allocate contiguous blocks of storage that may or may not reside within additional address spaces. While this may have some functionality, it is highly limiting, and only serves to use multiple address spaces as additional storage rather than the multiple dimensionality that is available by the hardware. Therefore, what is needed is a high-level programming language that effectively utilizes multiple virtual storage areas.

These disclosures provide systems and methods where a high-level programming language may effectively utilize multiple virtual storage areas. Such utilization may be achieved through the application of specific syntax. Systems and methods for identifying the use and need for multiple spaces may define the elements necessary, and additional variable identifications may produce a connection to the alternative address spaces. These changes to high-level programming language definitions and statements may produce a compliable high-level program that may operate upon data stored in multiple address spaces, while allowing the programmer to develop these programs without the necessity of machine-level code.

In exemplary embodiments, without limitation, this may be accomplished by providing one or more universes for such data and variables. These universes may each comprise their own set of data and variables in a virtual memory arrangement. A number of types of universes may be defined. Parallel universes may define spaces which each are independently defined and do not depend on one another. A new parallel universe may be created whenever a data or variable value is changed. Conjoined universes may be created by essentially duplicating a given universe, however, at least one value in the new, conjoined universe is independent from the given universe but at least one other value in the new, conjoined universe may depend on the value in the given universe. Sequenced universes may be created by essentially duplicating a given universe, however, at least one additional data or variable point may be added. Again, at least one value in the new, sequenced universe may be independent from the given universe but at least one other value in the new, sequenced universe may depend on the value in the given universe. For at least the conjoined and sequenced universes, updating the given universe may result in updates to the sequenced or conjoined universes. Additionally, or alternatively, direction to create a different value for the data or variable point may result in the creation of a new parallel, conjoined, or sequenced universe.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
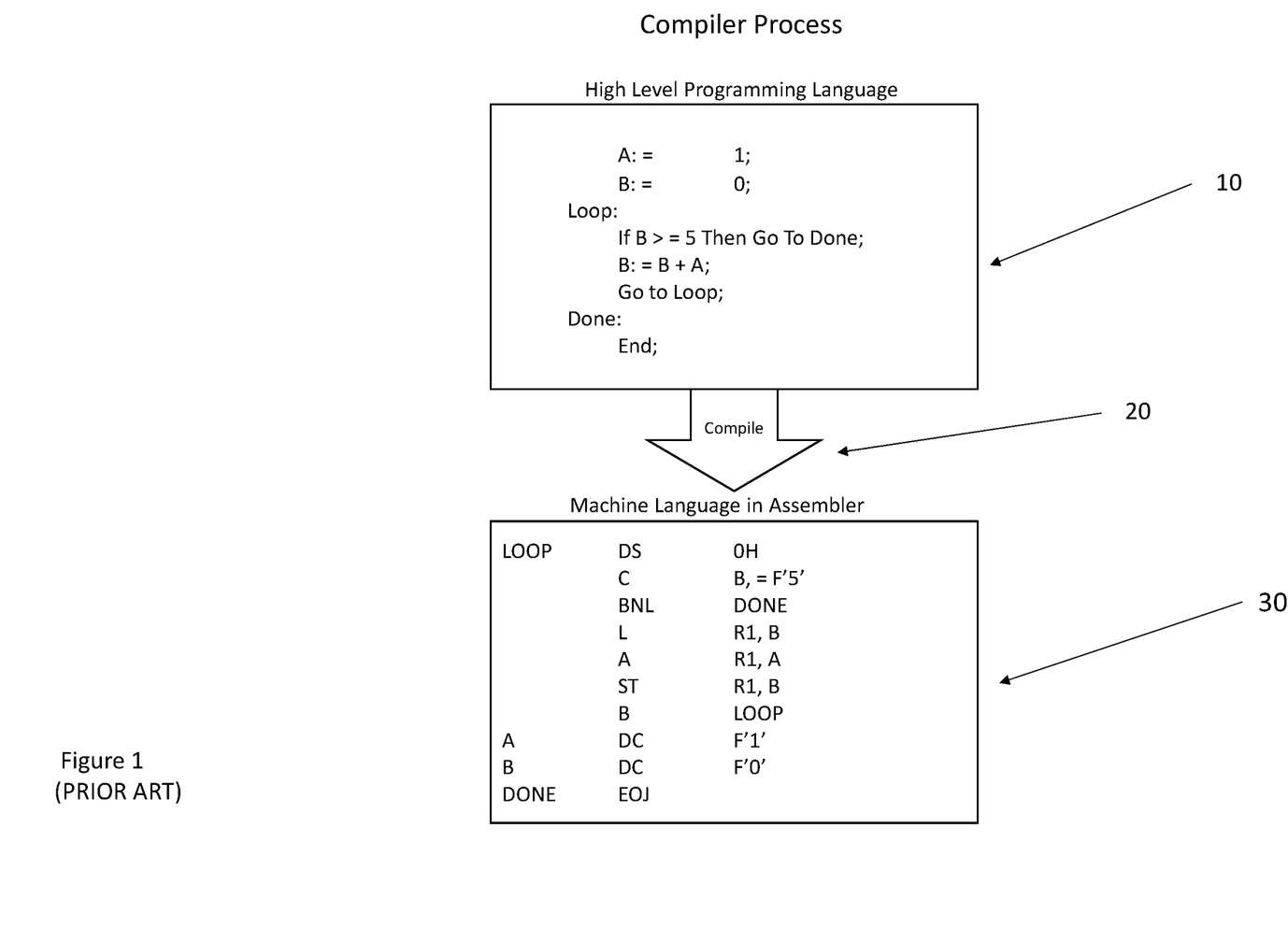
FIG. 1 illustrates an exemplary compiler process.

FIG. 1 is an example of a compiler 20 that translates a high-level programming language 10 into a machine-level language 30. FIG. 1 provides an example of a simple program in the high-level programming language 10 and in the machine-level code 30. Both programs operate to produce the same result. However, the program written in the high-level programming language 10 is far more understandable to a human than the program presented in machine-level language 30. High-level programming languages 10 tend to have common elements that may be processed by a language compiler 20 into a more machine specific, machine-level executable version 30. These elements usually include the following, which are provided as examples and are not intended to be limiting.

Environmental: Where specific elements of the targeted machine are carefully defined so that the language compiler 20 may produce correctly executable machine-level code 30.

Data Definition: Where named variables or arrays are identified. This allows the language compiler 20 to determine the name of the variable, along with its potential content and memory space. During the compilation process, the language compiler 20 may produce machine-level code 30 that allows for operations between variables that are appropriate to the data content contained with them.

Program Statements: Logical operations, such as decisions, branches, loops, groupings, and mathematical/logistical operations upon variables are presented by a series of statements. These statements may all follow a predefined syntax and may form the logic of the program. These logical statements may be provided in the high-level programming language 10 and translated by the compiler 20 into machine-level instructions 30, for example as illustrated in FIG. 1.

Subroutines and Procedures: Grouping of statements that might be utilized more than once may be organized into a functional routine that may be called or invoked from some other placement within the overall program. These routines may have their own data definitions, may be reentrant, or be serially reusable.

Block Data Definitions: Where a collection of variables may be defined so that an allocated block of storage may be used to contain such variables. These allocations may occur dynamically within the program's execution, and this definition may allow the compiler 20 to determine how to handle the language translation of any variable's usage within the dynamically defined area.

In order to identify and manipulate multiple storage address spaces for a high-level programming language 10, several extensions may be made to the elements presented above. These changes or additions are not merely syntax or language extensions, but rather conceptual changes to the way that the entire programming environment is understood.

Figure 2:
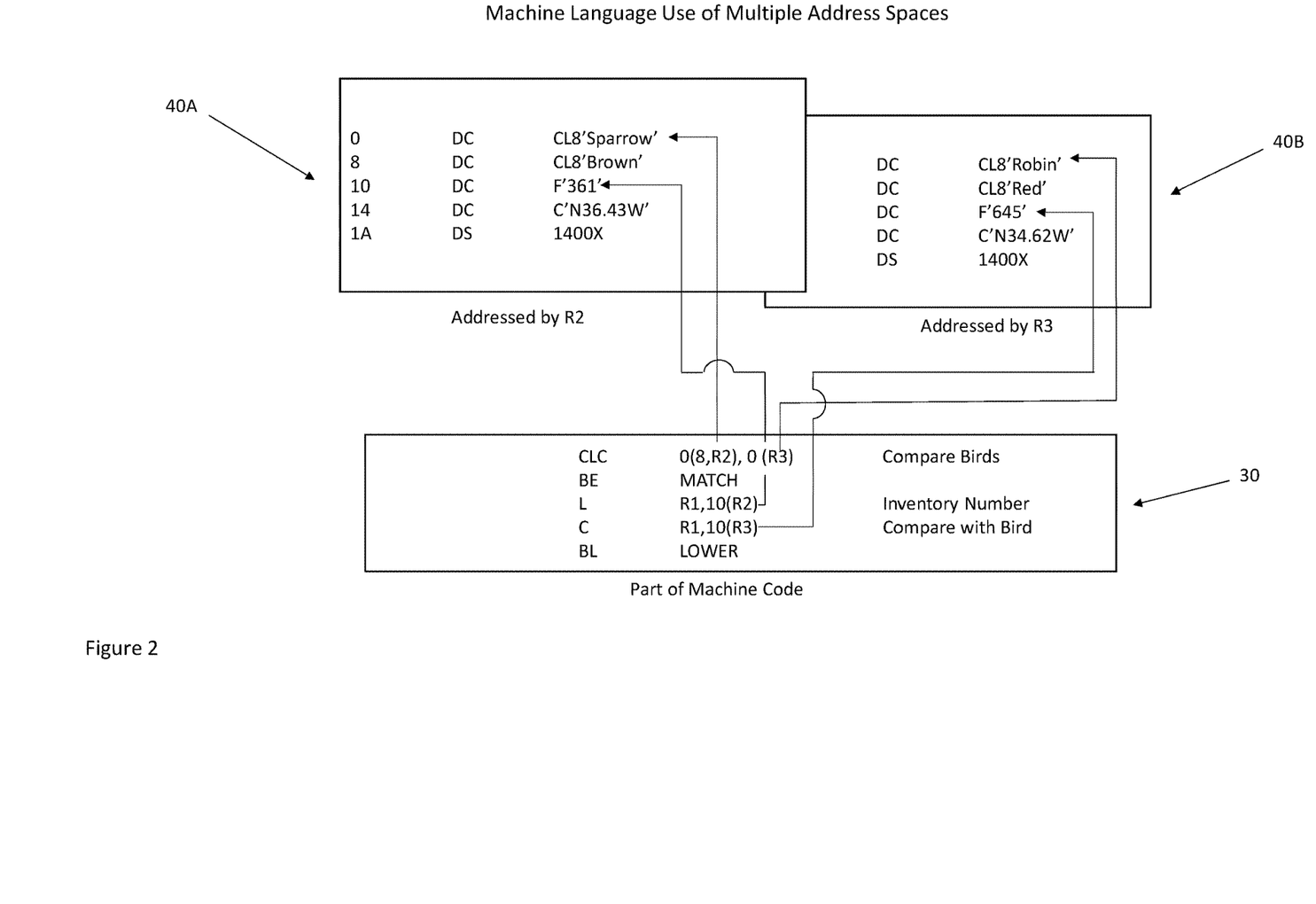
FIG. 2 illustrates an exemplary machine-level language use of multiple address spaces in accordance with the present disclosures.

FIG. 2 is an exemplary machine-level language 30 use of multiple address spaces 40. Each storage address space 40 may be described herein as a separate universe 40 of data and variables. The program itself may function independently from a given universe 40. In other words, in a normal and expected programming environment, there is only one universe 40 for data and variables, and all the data managed and manipulated by the program resides somewhere within this one universe 40. However, in the disclosed systems and methods, multiple universes 40 may be provided, each of which may contain its own set of data and variables. While the program remains consistent, the universe 40 for the data may change, and thereby all the referenced values may change as well. More than one universe 40 may be utilized by a given program.

For example, without limitation, if an address space 40 contains all the data and variables concerning the life and flight of a single bird, the program may be written to handle these variables and simulate the movement and actions of this one bird. However, when the variable that identifies the specific bird is changed to represent another bird, the address space 40 changes with that variable value and therefore, so do all the data and variables. In this way, each address space 40 acts as a separate version of the program, seeing the world differently depending upon a single variable that defines the specific bird.

The following examples of language syntax are used here for purposes of illustrations and are by no means exhaustive and therefore are not intended to be limiting. It is contemplated that extensions to various higher-level programming languages may appear differently and may utilize different language syntax. However, at least the following specific elements and syntax are contemplated for example, without limitation.

$$\text{Define Universe by var as} \left\{ \begin{array}{l} \text{Parallel} \left\{ \begin{bmatrix} \text{Fluid} \\ \text{Rigid} \end{bmatrix} \right\} \\ \text{Conjoined} \\ \text{Sequenced} \end{array} \right\}$$

Figure 3:
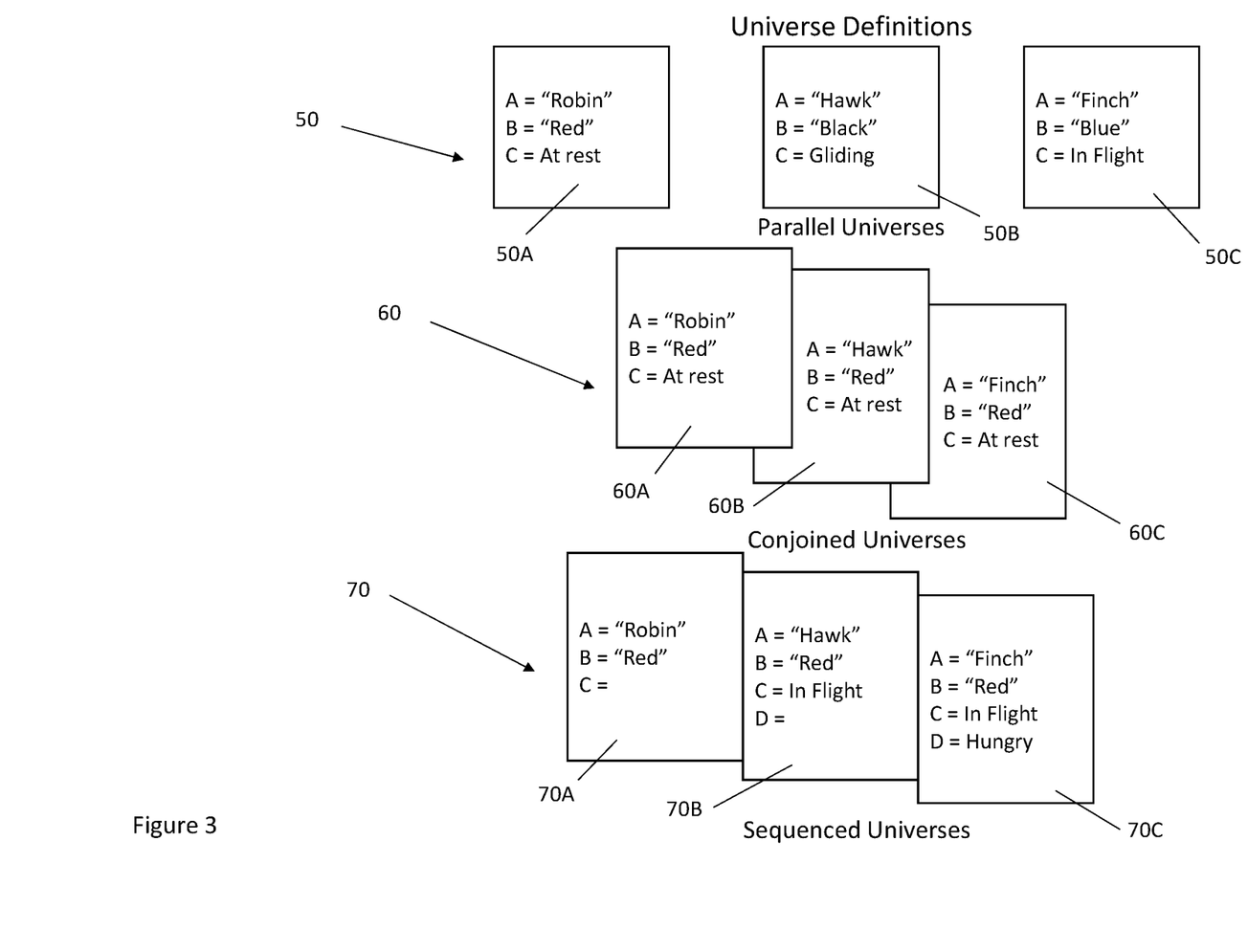
FIG. 3 illustrates an exemplary high-level programming language syntax in accordance with the present disclosures.

This data definition may identify the creation of multiple address spaces 40, which may be referred to herein as universes 40. While the underlying hardware may define address spaces 40 as large contiguous areas of memory that are addressable as a continuum, the language reference may identify how these spaces are to be understood from a programming point of view. There are three distinctly different types of universes 40, as illustrated in FIG. 3 and discussed herein.

Parallel: Parallel spaces 50 may maintain completely independent contents, and may be created whenever there is a change in the value of the specifically identified variable. In the example shown and described with respect to FIG. 3, the value of "A" may act as the delaminating variable as it is not the same value for any parallel space 50A-50C. In other words, the definition for "A" may be established by using a command such as, but not limited to, "Define Universe by A as Parallel" to create a new parallel address space 50 whenever the value contained within the variable A is changed. Furthermore, whenever the value of A matches an address space of a parallel universe 50A-50C, then all of the data variables within that same space are also available for the operating program. The additional concepts of fluid and rigid parallel universes 50A-50C may be used to define whether the address space encompasses all of the variables in the program (i.e., fluid) or only a defined subsection (i.e., rigid). Parallel universes 40 may define spaces which each are independently defined and do not depend on one another. A new parallel universe (e.g., 40B or 40C) may be created whenever a data or variable value is changed in a given parallel universe (e.g., 40A).

Conjoined: Conjoined spaces 60 may be defined by the hardware as having separate virtual identities. However, such spaces may share some or most of the data and variable content. As variables are defined, it may be possible to limit the existence of a variable to a specific conjoined universe space 60A-60C, or allow the variable to have an identity within all conjoined spaces 60A-60C, and therefore be updatable by each conjoined space 60A-60C separately. This differs from the concept of a parallel universe 50A-50C, where variables within each parallel space 50A-50C maintain their own separate values. Conjoined universes 60 may be created by essentially duplicating a given universe (e.g., 60A), however, at least one value of the new, conjoined universe (e.g., 60B) may be independent from the given universe (e.g., 60A) while at least one other value of the new, conjoined universe (e.g., 60B) may depend on the value in the given universe (e.g., 60A). For example, conjoined universe 60B is the same as universe 60A, but with the value of A changed from "Robin" to "Hawk" in the example provided in FIG. 3.

Sequenced: Sequenced spaces 70 may take on the values of the space 70A-70C in control at the time of its creation. However, once in existence a given sequenced space 70A-70C may otherwise function as a parallel space 50 and may diverge from all other spaces 40. Therefore, when the delaminating variable changes to a value unrepresented within any current sequenced space 70A-70C, the address space 70A-70C in previous use may be duplicated completely to create the new space 70A-70C, and only the delaminating variable may hold a unique value. However, once created, this space's 70A-70C variables may diverge freely and may not be connected or related to any other space 70A-70C. Sequenced universes 70 may be created by essentially duplicating a given conjoined universe (e.g., 70A), however, at least one additional data or variable point may be added. Again, at least one value in the new, sequenced universe (e.g., 70B) may be independent from the given universe (e.g., 70A), but at least one other value of the new, sequenced universe (e.g., 70B) may depend on the given universe (e.g., 70A). For example, sequenced universe 70B may be the same as universe 70A, but with the value of C defined as "Inflight" in the example provided in FIG. 3.

In at least the conjoined 60 and sequenced 70 universes, updating one universe 40 may result in updates to the sequenced 60 or conjoined 70 universes. Additionally, or alternatively, direction to create a different value for the data or variable point may result in the creation of a new parallel 50, conjoined 60, or sequenced 70 universe.

Variable Reference within Expressions and Statements
Var[! Universe qualifying value]
As multiple address spaces, i.e., universes 40, of variables and data are available to any given program, there may be times when an expression or statement may need to reference the specific value of a variable contained within a specific space 40. Generally, when a program makes reference to a variable, this variable may be the one that is within the primary space correctly in execution. In other words, whenever the content of the delaminating variable is changed, the address space 40 may be modified so that the primary space is the one that contains a delaminating value that matches the change. Each address space 40 may contain a delaminating variable that is unique to one, and only one, address space 40.

Using a qualified variable reference, the program may access information stored in address spaces 40 other than the primary address space 40 for the program. For example, given the illustration in FIG. 3 of parallel universes 50, a statement A:="Hawk" may cause the Hawk address space to become the primary space, and therefore, the values of B and C may immediately become "Black" and "Gliding" respectively.

However, if the programmer wants to compare the values of different address spaces 40, a qualifying modifier may be added. For example, without limitation, the statement "If B=B!A='Finch' Then . . . " may allow the value of B, which in the given example of FIG. 3 is currently "Black", to be compared with the value of "Blue", which is the contents of variable B, within the universe 50C where A is equal to the value of "Finch." This system and method of variable references may permit specific references to specific spaces 40 to be made without forcing a change to the primary address space 40 currently being used by the program. These universe qualifying expressions may be as complex as necessary in order to properly identify the value within the delaminating variable. The only necessary identification may be a symbolic separator, herein used as "!" though any type of symbolic separator is contemplated, that separates the variable name from the qualifying expression.

Multiple Processing
In order to perform more complex operations on multiple address spaces 40 or universes 40, the following additional operational statement may be available:

Whileas universe – expression *Beginwith*

$$\left\{ \begin{array}{l} \text{Statements and operations to be done in another process} \\ \text{or subtask while the primary program continues operation} \end{array} \right\}$$

*Endwith*

When this block of statements is presented, the universal expression may be used to locate an appropriate address space 40, and the program may begin executing within that universe 40. Stated another way, a separate programming process may be created, where its primary address space 40 may have a value that is identified by the universe-expression. These statements may operate in parallel and may not delay the operation of the primary program which may immediately continue to operate on the program statement following the "End with", or similar, syntax. The specific choice of syntax is presented for illustration, and other formats may well be more appropriate for other languages.

It is possible to involve multiple processes, each operating within their own universes 40, through a higher nesting. For example, if the delaminating variable is V, and it has a value of 1, 2 and 3, each within their own universes 40, the following statements may create three subtasks or processes:

```
For A:=1 to 3 Begin
    Whileas V:=A Beginwith
        Statement ...
        ...
        Statement ...
    Endwith
End
```

The universe-expression may not cause a change to the primary program's address space 40, but rather may select an address space 40, and creates a separate process to execute the statements, having access to that address space 40.

With these three extensions to a higher-level programming language, a complex and powerful control over multiple address spaces 40 may be gained.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means.

What is claimed is:

1. A method for utilizing virtual memory with a high-level programming language, said method comprising the steps of:
    creating multiple address spaces in virtual memory, wherein:
        each of said multiple address spaces comprise multiple data entries;
        each of said data entries comprise a value;
        a first set of said multiple address spaces is independent from a second set of said multiple address spaces such that the value of the data entries of each of the first set of said multiple address spaces do not reference the value of any of the data entries of the second set of said multiple address spaces; and
        a third set of said multiple address spaces is electronically associated with a fourth set of said multiple address spaces such that the value of at least one of the data entries of the third set of said multiple address spaces references the value of at least one of the data entries of the fourth set of said multiple address spaces;
    operating a machine executable software program which utilizes each of said multiple address spaces;
    changing the value of a particular one of the data entries of a particular one of the fourth set of said multiple address spaces; and
    updating the value of all of the data entries of the third set of said multiple address spaces referencing the particular one of the data entries of the particular one of the fourth set of said multiple address spaces.

2. The method of claim 1 further comprising the steps of:
    creating a new address space electronically associated with a given one of said multiple address spaces, wherein said new address space comprises a first subset of data entries having values referencing the values of the data entries of said given one of said multiple address spaces and a second subset of the data entries of said new address space which comprises a new value different from, and not referencing, the values of the data entries of said given one of said multiple address spaces.

3. The method of claim 2 further comprising the steps of:
    changing the value of a given one of the data entries in said first subset of data entries of said given one of said multiple address spaces to a changed value; and
    automatically updating a corresponding one of the data entries of said new address space to said changed value, wherein operation of said machine executable software program is configured to utilize said new address space and said multiple address spaces.

4. The method of claim 1 further comprising the steps of:
    creating a new address space electronically associated with a given one of said multiple address spaces, wherein said new address space comprises a subset of data entries having values referencing the values of the data entries of said given one of said multiple address space, and wherein said new address spaces comprises an additional subset of data entries not referencing any of the data entries in said given one of said multiple address spaces having an additional value.

5. The method of claim 4 further comprising the steps of:
    changing the value of a given one of the data entries in said subset of said data entries of said given one of said multiple address spaces to a changed value; and
    automatically updating a corresponding one of the data entries of said new address space with said changed value, wherein operation of said machine executable software program is configured to utilize said new address space and said multiple address spaces.

6. The method of claim 1 wherein:
    the value of a given one of the data entries of a given one of said multiple address spaces comprises a reference to the value of a particular one of the data entries of a particular one of said multiple address spaces; and
    operation of said machine executable software program comprises the sub-steps of referencing the value of the particular one of the data entries of the particular one of said multiple address spaces upon attempted retrieval of the value of the given data entry of the given one of said multiple address spaces such that the value of the given one of the data entries of the given one of said multiple address spaces is automatically updated for operation of said machine executable software program.

7. The method of claim 6 wherein:
operation of said machine executable software program comprises the sub-steps of comparing the value of the particular one of the data entries of the particular one of said multiple address spaces with the value of the given data entry of the given one of said multiple address spaces.

8. The method of claim 6 further comprising the steps of:
operating a second machine executable software program in parallel with said machine executable software program, wherein said second machine executable software program utilizes at least a subset of said multiple address spaces.

9. A system for utilizing virtual memory with a high-level programming language, said system comprising:
one or more computing devices configured to utilize virtual memory and comprising software instructions, which when executed, configure the one or more computing devices to:
create multiple address spaces in said virtual memory;
populate data entries of each of said multiple address spaces with values, wherein a subset of the data entries of a subset of said multiple address spaces each comprises a reference to the value of one of the data entries in a second subset of data entries of a second subset of said multiple address spaces;
change the value of a given one of the data entries of the second subset of said data entries of the second subset of said multiple address spaces;
automatically update the value of each of the data entries in the subset of the data entries of the subset of the multiple address spaces comprising the reference to the value of the given one of the data entries of the second subset of said data entries of the second subset of said multiple address spaces such that the value of remaining ones of said data entries in said subset of said data entries of said subset of said multiple address spaces remain unchanged.

10. The system of claim 9 further comprising:
additional software instructions stored at the one or more computing devices which when executed configure the one or more computing devices to:
create a new address space electronically associated with a particular one of said multiple address spaces, wherein said new address space comprises data entries having values referencing the values of the data entries of said particular one of said multiple address space except for a particular one of the data entries of said new address space which comprises a new value different from, and not referencing, the value of a corresponding one of the data entries of said particular one of said multiple address spaces;
change the value of a second particular one of the data entries of said particular one of said multiple address spaces to a changed value, wherein said second particular one of said data entries is not said corresponding one of said data entries of said particular one of said multiple address spaces;
update a corresponding one of the data entries of said new address space to said changed value, wherein said corresponding one of the data entries of said new address space comprises a reference to the value of said second particular one of the data entries of said particular one of said multiple address spaces;
create a second new address space electronically associated with said particular one of said multiple address spaces, wherein said second new address space comprises data entries having values referencing the values of the data entries of said particular one of said multiple address space, and wherein said second new address spaces comprises an additional data entry not found in said particular one of said multiple address spaces having an additional value;
change the value of a third particular one of the data entries of said particular one of said multiple address spaces to a second changed value;
update a corresponding one of the data entries of said second new address space with said second changed value, where said corresponding one of said data entries is not said additional data entry, and wherein said corresponding one of said data entries comprises a reference to said third particular one of said data entries of said particular one of said multiple address spaces; and
operate a machine executable software program which utilizes each of said multiple address spaces, said first new address space, and said second new address space.

11. The system of claim 10 further comprising:
additional software instructions stored at the one or more computing devices which when executed configure the one or more computing devices to operate a second machine executable software program in parallel with said machine executable software program, wherein said second machine executable software program utilizes at least a subset of said multiple address spaces, said first new address space, and said second new address space.

12. The system of claim 11 further comprising:
additional software instructions stored at the one or more computing devices which when executed configure the one or more computing devices to reference the value of a certain one of the data entries of a certain one of said multiple address spaces upon attempted retrieval of the value of a different one of the data entries of a different one of said multiple address spaces, wherein the value of the different one of the data entries of the different one of said multiple address spaces comprises a reference to the value of the certain one of the data entries of the certain one of said multiple address spaces.

13. A method for utilizing virtual memory with a high-level programming language, said method comprising the steps of:
creating multiple address spaces in virtual memory, wherein each of said multiple address spaces comprises data entries, and wherein each of said data entries comprises a value;
creating a new address space electronically associated with a given one of said multiple address spaces, wherein said new address space comprises data entries having values referencing the values of the data entries of said given one of said multiple address spaces except for a particular one of the data entries of said new address space which comprises a new value different from, and not referencing, the value of a corresponding one of the data entries of said given one of said multiple address spaces;
changing the value of a given one of the data entries of said given one of said multiple address spaces to a changed value, wherein said given one of said data entries is not said corresponding one of said data entries of said given one of said multiple address spaces;

updating a corresponding one of the data entries of said new address space to said changed value by reference;

creating a second new address space electronically associated with a second given one of said multiple address spaces, wherein said second new address space comprises data entries having values referencing the values of the data entries of said second given one of said multiple address spaces, and wherein said second new address space comprises an additional data entry not found in said second given one of said multiple address spaces having an additional value;

changing the value of a given one of the data entries of said second given one of said multiple address spaces to a second changed value;

updating a corresponding one of the data entries of said second new address space with said second changed value by reference, where said corresponding one of said data entries is not said additional data entry; and operating a machine executable software program which utilizes each of said multiple address spaces, said first new address space, and said second new address space, wherein the value of a certain one of the data entries of a certain one of said multiple address spaces comprises a reference to the value of a different one of the data entries of a different one of said multiple address spaces, and wherein operation of said machine executable software program comprises the sub-steps of referencing the value of the different one of the data entries of the different one of said multiple address spaces upon attempted retrieval of the value of the certain one of the data entries of the certain one of said multiple address spaces;

wherein at least a first one of said multiple address spaces is independent from at least a second one of said multiple address spaces, and at least a third one of said multiple address spaces is electronically associated with at least a fourth one of said multiple address spaces.

14. The method of claim 13 further comprising the steps of:

operating a second machine executable software program in parallel with said machine executable software program, wherein said second machine executable software program utilizes at least a subset of said multiple address spaces, said first new address space, and said second new address space.

\* \* \* \* \*